No. 754,308. PATENTED MAR. 8, 1904.
J. C. HEIDT.
TIDE WATER TRUNK OR FLOOD GATE.
APPLICATION FILED OCT. 24, 1903.
NO MODEL. 2 SHEETS—SHEET 2.
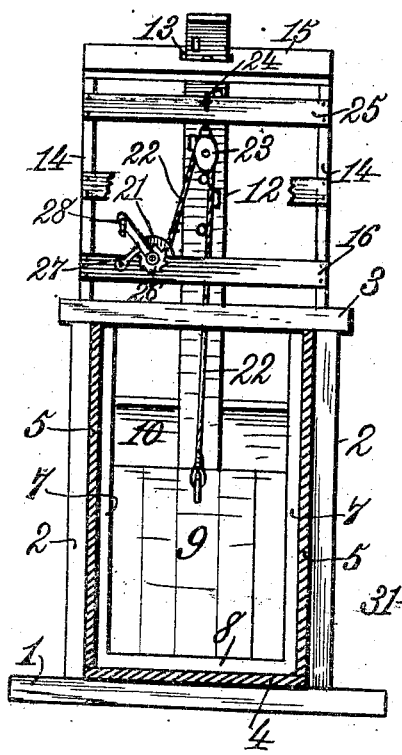
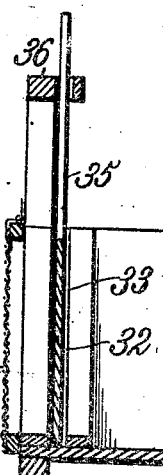
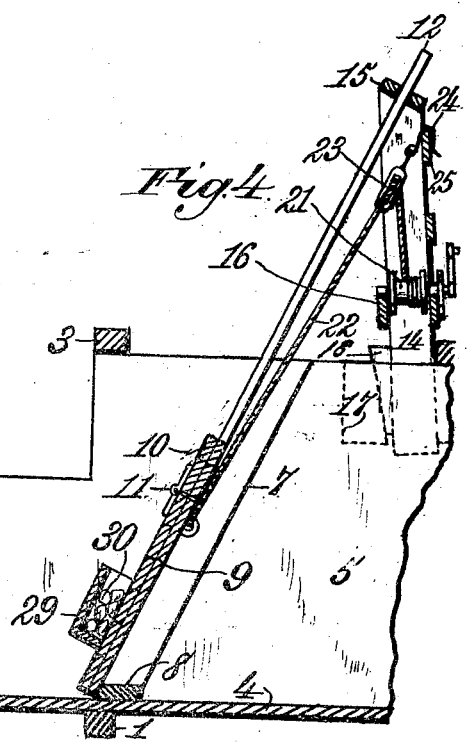
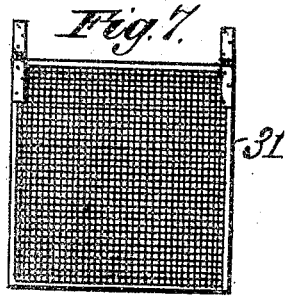
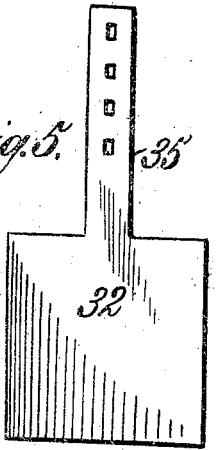
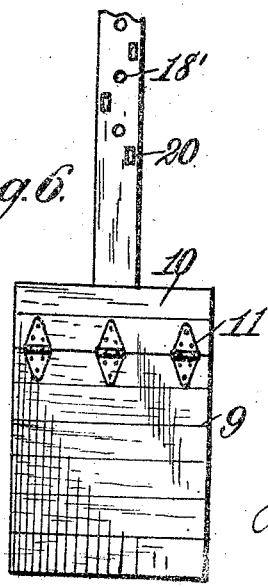

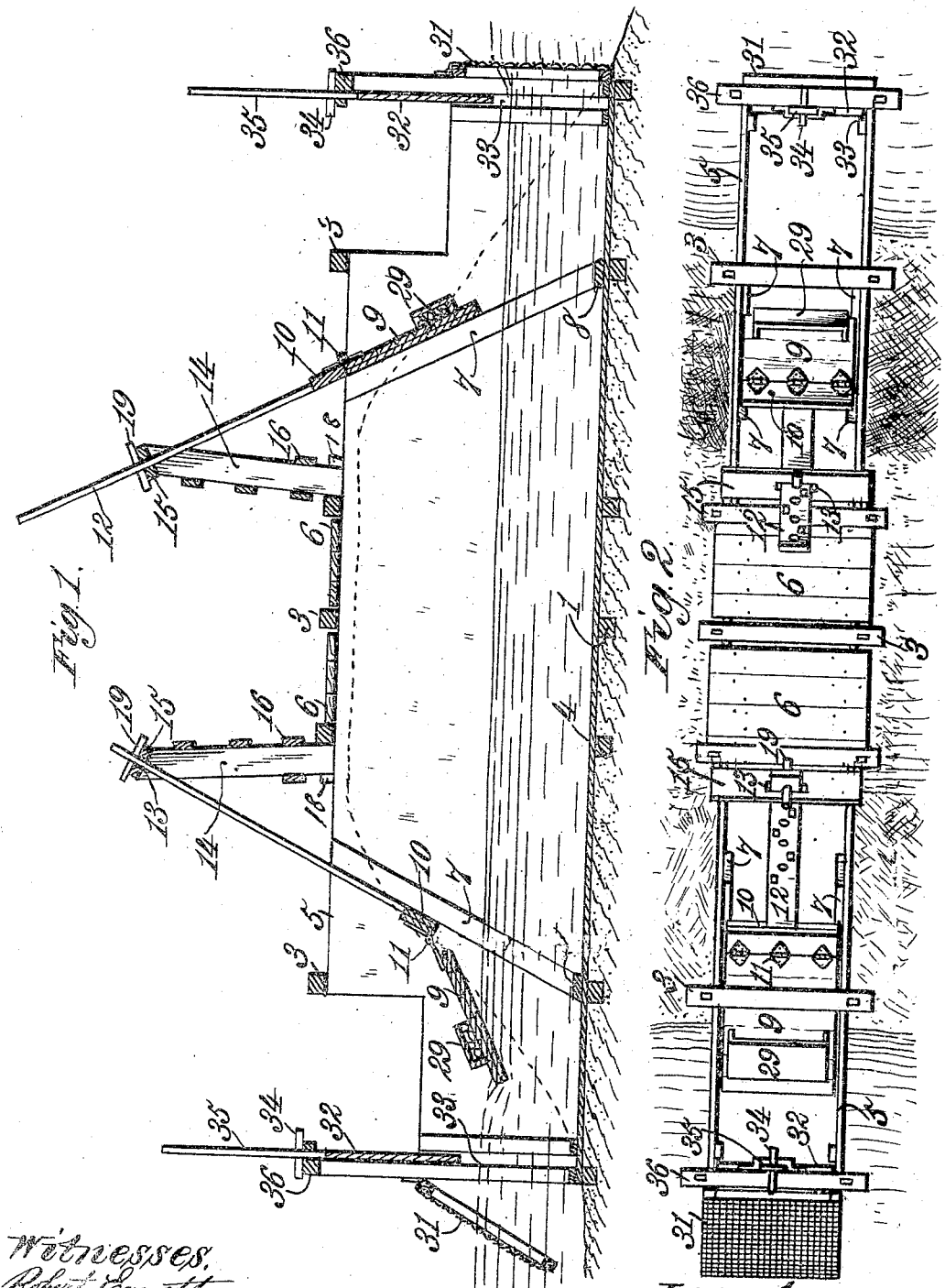

No. 754,308. Patented March 8, 1904.

UNITED STATES PATENT OFFICE.

JESSE C. HEIDT, OF BAILEYS MILLS, GEORGIA.

TIDE-WATER TRUNK OR FLOOD-GATE.

SPECIFICATION forming part of Letters Patent No. 754,308, dated March 8, 1904.

Application filed October 24, 1903. Serial No. 178,330. (No model.)

*To all whom it may concern:*

Be it known that I, JESSE C. HEIDT, a citizen of the United States, residing at Baileys Mills, in the county of Camden and State of Georgia, have invented certain new and useful Improvements in Tide-Water Trunks or Flood-Gates; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to tide-water trunks or flood-gates for irrigation purposes, and is particularly designed for flooding or irrigating rice-fields, although it may be used for irrigating other fields.

It has for its object to provide such a trunk or flood-gate provided with two oppositely-disposed gates or doors arranged within the trunk, one near each end of the trunk, and hinged so as to swing outwardly or toward the outer end of the trunk, so that the gate will swing to an open position by the pressure of the water against one face and flowing in one direction and closed by the pressure of the water against its opposite face, whether the operative gate for the time being be the one next to the field to be irrigated or the one next to the source of water-supply.

It has further for its object to provide means for preventing trash or debris from entering the trunk at either end thereof, so that the interior operative parts of the trunk will not be injured by such trash or debris.

It has further for its object to provide simple means for preventing water from entering the trunk at either end, so that the interior of the trunk will have water excluded therefrom when access is to be had to the interior for inspection or repairs.

It has further for its object to generally simplify and cheapen the cost of construction of an efficient trunk or flood-gate for the purposes stated.

To the accomplishment of the foregoing and such other objects as may hereinafter appear, the invention consists in the construction and in the combination of parts hereinafter particularly described and then sought to be clearly defined by the claims, reference being had to the accompanying drawings, forming a part hereof, and in which—

Figure 1 is a vertical longitudinal section through a trunk or flood-gate embodying my invention. Fig. 2 is a plan view of the same. Fig. 3 is a vertical cross-section through the same. Fig. 4 is a vertical longitudinal section through a portion of the trunk, showing the windlass arrangement by which the gates may be raised and lowered. Fig. 5 is a front view of one of the cut-off gates. Fig. 6 is a face view of one of the swinging gates or doors, and Fig. 7 is a face view of one of the end screens.

In the drawings the body portion of the trunk is illustrated as composed of the mud-sills 1, the upright posts 2, the top cross bars or beams 3, the floor 4, and the sides 5. The mud-sills, upright posts, and cross-beams may be made of wooden timbers of suitable dimensions dovetailed or otherwise secured together, and the floor and sides will be composed of suitable boards or planks, and the mud-sills are preferably extended beyond the sides of the body portion, so as to give greater stability to the body portion when resting in the dock made for it. The body portion is open at the top except for a portion thereof, which is covered by a removable platform or bridge 6.

Within the body portion of the trunk, at a distance back from each end thereof, there is secured a frame which for convenience I will designate a "muzzle," the same being formed of timbers or pieces 7, bolted or otherwise secured to the inside of the side walls of the body of the trunk and inclined from the bottom upwardly toward the middle or central portion of the trunk at an angle of from forty to forty-five degrees, more or less, and of cross timbers or pieces 8 at the lower ends of these inclined pieces and resting upon the floor and extending from one side to the other; said bottom pieces being beveled, so as to conform to the inclination of the side timbers or pieces of the frame. Each frame thus formed constitutes a seat for a swinging valve or gate.

Each of these valves or gates is composed of a portion 9, which preferably is made of planks or boards crossing each other or "battened," as illustrated, and a portion 10 likewise formed, the portion 9 being connected to the portion 10 by hinges 11 or otherwise, so as to swing into an opened and a closed position. The portion 10 has extending upwardly therefrom an arm 12, which passes through a slot or opening 13, formed in the top cross bar or member of a frame which is composed of uprights 14 and top cross bar or member 15 and which may be braced by cross-bars 16, each of said frames being suitably secured to and supported from the body of the trunk—for instance, by having the lower ends of the uprights 14 fitting in sockets 17, formed on the sides of the body portion of the trunk, near the top thereof, and locked therein by wedges 18 or otherwise. (See Fig. 4.) These frames stand substantially at the inclination shown, although that may be changed, and they permit said valves to be raised and lowered by a sliding movement, said valves in such movement being guided by their arms 12. These arms are provided with a series of openings 18', through any one of which a pin 19 may be passed and which will bear against the top member or bar 15 of the frame just described, so as to sustain said valves to whatever position they may be adjusted vertically. These hinged and sliding valves may be raised by an ordinary bar or lever, which may be inserted through one of a series of openings 20 made in the arm 12, said lever in such case having a purchase or bearing on one of the cross-bars 16 of the frame when lifting the valve, said lever not being illustrated, as it may be an ordinary straight lever or crowbar. It is preferred, however, to provide a windlass for raising each of these hinged and sliding gates or valves. Such means for the purpose is illustrated and consists of a windlass 21, supported by the cross-bars 16 and provided with a cable 22, which passes over a pulley-block 23, suspended by a hook 24, engaging a cross-bar 25, the lower end of said cable being connected to the lower member 9 of the hinged and sliding gate on the side thereof opposite to the hinges. By this means the hinged and sliding gate may be raised to the height desired to permit the desired volume of water to flow through the trunk, the gate being held to its adjusted position by means of the pin 19, passed through one of the openings 18' in the upwardly-extending arm 12 of the gate. The windlass is provided with a ratchet 26, with which engages a pawl 27, and is also provided with a handle 28, by which it may be turned. After the gate has been adjusted to the height desired, at which it is supported by the pin 19, the cable may be slackened, if desired, as the gate will be supported in its raised position by the cross-pin 19. The windlass, however, might constitute the sole means for sustaining the gate at its elevated position; but its primary purpose is to raise and lower the gate. The cable of the gate which controls the outflow of water from the trunk is at such time slack, so as to permit the lower hinged member of the gate to swing under the influence of the pressure of the water, and thus permit the gate to open for the flow of the water—for instance, as illustrated in Fig. 1 of the drawings, where the water is supposed to flow from the source of supply through the trunk to the field to be irrigated, say, on the rise of the tide. With the parts in the position illustrated in Fig. 1 of the drawings on the ebb of the tide the pressure of the water over the irrigating-field against the gate at that end of the trunk will close the gate against its muzzle or seat, and thus prevent the outflow of the water from the field through the trunk. It will thus be seen that the gate is automatically opened and closed by the pressure of the water. If desired, each gate may be provided on its face to which the hinges are applied with a box 29 to contain stones or other substances 30 for the purpose of weighting the gate in order to expedite the closing of the gate when the flow of water through the trunk is to be prevented. Under the same construction and arrangement of parts when it is desired to drain the irrigation-field and keep the same dry the gate next to the field is raised and the gate at the opposite end of the trunk lowered, so that the latter gate will be opened by the outflow of water through the trunk, after which said gate will automatically or by gravity seat itself against its muzzle or seat and prevent inflow of the water on the rise of the tide.

For the purpose of preventing trash or debris entering the trunk and interfering with the satisfactory working of the hinged gates or valves the body of the trunk at each end is provided with a screen 31, which is hinged to the body of the trunk, so as to swing outwardly from the ends of the trunk. The pressure of the water against the hinged screen at the end where the water enters the trunk-body will close the screen, so as to prevent trash and debris from entering the trunk, the water passing through the meshes of the screen, and the pressure of the water flowing out of the trunk at the opposite end will swing open the screen at that end, so as to allow the free passage of the water from the trunk. If logs or debris should be floating on the irrigated field and it be desired to carry the same off into the river, both of the hinged gates in the trunk will be raised, as well as the hinged screens at the opposite end of the trunk, so that on the ebb-tide the trash and debris will be carried out into the river through the trunk.

For the purpose of excluding water entirely from the trunk when it is desired to have access to the interior of the trunk for inspection or repairs there is provided at each end of the trunk a cut-off gate 32, which slides vertically in grooved ways 33. Normally or when the hinged gates of the trunk are in operation these cut-off gates 32 are raised and held in their raised position by pins 34, passing through extensions 35 of the cut-off gates and resting upon cross-bars 36, so as to sustain the gates in their raised position. When the trunk is emptied of water and is to be kept dry for inspection or repairs, these cut-off gates are lowered, so as to prevent water from entering the trunk.

The tide-water trunk or flood-gate constructed as described has from actual use been found to give most satisfactory results. It is comparatively cheap to construct, its parts are not liable to get out of working order, and it enables the planter to control with ease and to the extent desired the supply or inflow and outflow of water to and from the irrigation-field, so that the best results are obtained.

I have described with particularity the preferred details of construction of the several parts and the manner of arranging and operating the same and the preferred material out of which the trunk may be constructed; but it is obvious that changes can be made in the several features and novel features of my invention be retained.

Having described my invention and set forth its merits, what I claim is—

1. The tide-water trunk comprising the body portion, and the hinged and sliding gates located within the body portion, one adjacent to each end of the body portion, substantially as described.

2. The tide-water trunk comprising the body portion, inclined seats located within the body portion adjacent to opposite ends thereof, slidable gates resting upon said seats and each having a hinged member, and means sustaining said gates in their adjustment, substantially as described.

3. The tide-water trunk comprising the body portion, slidable gates supported in an inclined position within the body portion, one adjacent to each end of the body portion, each gate having a hinged member, and screens located one at each end of the body portion of the trunk, substantially as described.

4. The tide-water trunk comprising the body portion, the inclined seats within the body portion, the sliding gates resting upon said inclined seats, each gate having a hinged member, a windlass, and a cable connected at one end to the windlass and at the other end to the hinged member of the gate on the side thereof opposite to its hinges for sliding the gate, substantially as described.

5. The tide-water trunk comprising the body portion, the slidable and two-part hinged gate located therein, an inclined seat for said gate, a hinged screen at the end of the body portion, and the vertically-slidable cut-off gate located between the hinged screen and the slidable two-part hinged gate, substantially as described.

6. The tide-water trunk comprising the body portion, the two gates located within the body portion, one adjacent to each end of the body portion, both of said gates being arranged in an inclined position, one being inclined in the opposite direction to the other and both hinged to swing open in the direction of the end of the body portion adjacent to which it is located, and inclined seats for said gates, substantially as described.

In testimony whereof I affix my signature in presence of two witnesses.

JESSE C. HEIDT.

Witnesses:
MATTIE L. KING,
ABNER D. HARRELL.